US012594866B2

(12) United States Patent
Kondrad et al.

(10) Patent No.: US 12,594,866 B2
(45) Date of Patent: Apr. 7, 2026

(54) VEHICLE USER SUPPORT INCLUDING UPPER HOOD MODULE

(71) Applicant: Ford Global Technologies, LLC, Dearborn, MI (US)

(72) Inventors: Marc Silva Kondrad, Macomb, MI (US); David D. Friske, Wolverine Lake, MI (US); Michael Joseph Niksa, Royal Oak, MI (US); Kevin Wayne Preuss, Ortonville, MI (US); Sangram Laxman Tamhankar, Farmington Hills, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 18/541,404

(22) Filed: Dec. 15, 2023

(65) Prior Publication Data

US 2025/0196739 A1 Jun. 19, 2025

(51) Int. Cl.
*B60N 2/48* (2006.01)
*B60N 2/64* (2006.01)
*B60N 2/879* (2018.01)
*H04R 1/02* (2006.01)
*B60N 2/80* (2018.01)

(52) U.S. Cl.
CPC ............. *B60N 2/643* (2013.01); *B60N 2/879* (2018.02); *B60N 2002/899* (2018.02)

(58) Field of Classification Search
CPC ...... B60N 2/5642; B60N 2/64; B60N 2/7017; B60N 2/80; B60N 2/62; B60N 2/565; B60N 2/809; B60N 2/70; B60N 2/68; B60N 2/6009
See application file for complete search history.

(56) References Cited

U.S. PATENT DOCUMENTS

| | | | |
|---|---|---|---|
| 6,854,869 B1 | 2/2005 | Fernandez | |
| 7,201,444 B2 | 4/2007 | Schimmoller | |
| RE42,340 E | 5/2011 | Anderson | |
| 9,694,741 B2 | 7/2017 | Salter et al. | |
| 9,776,543 B2 * | 10/2017 | Line .......................... | B60N 2/62 |
| 9,802,535 B2 | 10/2017 | Line et al. | |
| 10,035,442 B2 | 7/2018 | Kondrad et al. | |
| 10,143,043 B1 | 11/2018 | Elson et al. | |
| 10,279,646 B2 | 5/2019 | Arens et al. | |
| 10,457,175 B2 | 10/2019 | Lang et al. | |
| 10,637,007 B1 | 4/2020 | Wang | |
| 10,910,592 B2 | 2/2021 | Kuon et al. | |

(Continued)

OTHER PUBLICATIONS

End Motive, "How to make 3D printed car parts—Custom truck emblems," website https://www.youtube.com/watch?v= hfs6XpP6JvE, Jan. 12, 2022, 2 pages.

(Continued)

*Primary Examiner* — Shin H Kim
(74) *Attorney, Agent, or Firm* — Vichit Chea; Price Heneveld LLP

(57) ABSTRACT

A user support includes a hood structure that is supported by a back frame structure of the user support. The hood structure may comprise a one-piece homogeneous polymer structure that is formed by an additive process. The hood structure may include solid structures and at least one porous lattice matrix that is integrally formed with the solid structures.

20 Claims, 9 Drawing Sheets

(56) References Cited

U.S. PATENT DOCUMENTS

| | | | | |
|---|---|---|---|---|
| 10,953,775 | B1 | 3/2021 | Maloney et al. | |
| 11,279,274 | B1 | 3/2022 | Selvasekar et al. | |
| 11,280,303 | B2 | 3/2022 | Christensen et al. | |
| 11,292,375 | B1 | 4/2022 | Nageshkar et al. | |
| 11,299,079 | B1 | 4/2022 | Skrbis et al. | |
| 11,533,793 | B2 | 12/2022 | Rogers et al. | |
| 11,665,830 | B2 | 5/2023 | Ali et al. | |
| 11,680,180 | B2 | 6/2023 | Gwengo et al. | |
| 11,780,355 | B1 | 10/2023 | Romelfanger et al. | |
| 2007/0001124 | A1 | 1/2007 | Moreno Sobrino et al. | |
| 2016/0039320 | A1* | 2/2016 | Subat | H04R 1/02 |
| | | | | 264/273 |
| 2017/0036577 | A1* | 2/2017 | Line | B60N 2/50 |
| 2017/0210256 | A1* | 7/2017 | Kondrad | B60N 2/643 |
| 2017/0210257 | A1* | 7/2017 | Kondrad | B60N 2/06 |
| 2017/0210262 | A1* | 7/2017 | Line | B60N 2/7094 |
| 2017/0210263 | A1* | 7/2017 | Line | B60N 2/707 |
| 2017/0214988 | A1* | 7/2017 | Ferretti | B60N 2/68 |
| 2018/0037146 | A1* | 2/2018 | Line | B60N 2/5825 |
| 2018/0043805 | A1 | 2/2018 | Baek et al. | |
| 2018/0361941 | A1 | 12/2018 | Mozurkewich et al. | |
| 2019/0092196 | A1 | 3/2019 | Prozzi et al. | |
| 2019/0287910 | A1 | 9/2019 | Keating et al. | |
| 2019/0298072 | A1 | 10/2019 | Bhatia et al. | |
| 2020/0231285 | A1 | 7/2020 | Udriste et al. | |
| 2020/0343770 | A1 | 10/2020 | Baker et al. | |
| 2021/0101510 | A1 | 4/2021 | Kondrad et al. | |
| 2022/0055751 | A1 | 2/2022 | Hansson et al. | |
| 2022/0177138 | A1* | 6/2022 | Hallford | B60N 3/004 |

OTHER PUBLICATIONS

Eric Strebel, "How to 3D Print Motorhead vehicle emblem bade for your car: prime sand and paint!," Website, https://www.youtube.com/watch?v=nOOFaH6Y46Y, Jun. 14, 2017, 1 page.
Hemmings, "How to Create a Custom 3D Printed Car Badge," website https://www.youtube.com/watch?v=vnOx9PzBZu8, Aug. 31, 202, 2 pages.
Kordare, "Designing and 3D Printing Custom Badges for my Car," website https://www.youtube.com/watch?v=_HYdTvx1dgQ, Jul. 24, 2020, 1 page.

* cited by examiner

VEHICLE USER SUPPORT INCLUDING UPPER HOOD MODULE

FIELD OF THE DISCLOSURE

The present disclosure generally relates to a user support for vehicles, and more particularly to a support assembly having an upper hood module that may include one or more components having a porous lattice matrix.

BACKGROUND OF THE DISCLOSURE

Various user supports for vehicles have been developed. Such supports may be configured to support a user and/or passengers in a vehicle interior during operation of the vehicle.

SUMMARY OF THE DISCLOSURE

An aspect of the present disclosure is a user support for vehicles. The user support includes a frame having a lower portion and a back portion that extends upwardly from the lower portion. The user support also includes a lower cushion secured to the lower portion of the frame. The lower cushion has an upwardly facing surface. The back support includes a back cushion secured to the back portion of the frame. The back cushion has a forwardly facing surface and an upper edge. The user support further includes a one-piece polymer hood structure having a base secured to the back frame structure, and an upper hood structure extending upwardly above the upper edge of the upper back frame structure. The one-piece polymer hood structure may include an integral porous lattice matrix extending between the elongated front and rear structures across the gaps. The user support further includes a pad assembly positioned above the back cushion. The pad assembly may include left and right pads secured to the one-piece polymer hood structure in a side-by-side configuration. Each pad may have a forwardly facing resilient layer of material, and a rear layer of material. Each pad further includes a porous lattice matrix that is integrally formed with the forwardly facing resilient layer of material and with the rear layer of material to form a one-piece homogeneous polymer structure. The porous lattice matrix is disposed between the forwardly facing resilient layer of material and the rear layer of material. The porous lattice matrix has a porous outer peripheral portion or shell extending between the forwardly facing resilient layer of material and the rear layer of material, whereby the porous outer shell is exposed and visible.

The elongated front and rear structures of each left and right outer structure may extend towards each other whereby a size of the gap between the elongated front and rear structure is reduced at the upper ends of the elongated front and rear structures.

The one-piece polymer hood structure may comprise nylon or other suitable material, and may be formed using an additive process.

The left and right pads may optionally comprise thermoplastic polyurethane.

Each of the left and right pads have a lower edge that is spaced apart from the upper edge of the upper cushion to form a horizontally extending gap.

The upper hood structure may include integral left and right outer structures, wherein each of the left and right outer structures include elongated front and rear structures extending towards each other whereby a size of a gap between the elongated front and rear structures is reduced at upper ends of the elongated front and rear structures.

The one-piece polymer hood structure may include a forwardly opening pocketed formed by a pocket structure that is integrally formed with upper ends of the left and right outer structures, and the user support may include a rest having a cushion disposed adjacent to the forwardly opening pocket, and a support structure interconnecting the rest with the back portion of the frame.

The left and right outer structures may extend upwardly and inwardly from the base towards one another.

The one-piece polymer hood structure may include an integral porous lattice matrix extending between the elongated front and rear structures across the gaps, wherein the integral porous lattice matrix has an exposed outer side that is visible.

Each of the elongated front and rear structures may comprise a porous lattice matrix and an impervious outer layer extending around and encapsulating the porous lattice matrix.

The base of the one-piece polymer hood structure may include a porous lattice matrix that is integrally formed with an impervious outer layer extending around at least a portion of the porous lattice matrix.

The porous lattice matrix of the base of the one-piece polymer hood structure may extend horizontally across a lower portion of the base of the one-piece polymer hood structure.

The user support may include a sound passageway having a first end that is configured to be operably coupled to a source of sound whereby sound enters the first end of the sound passageway. The sound passageway has a second end with at least one opening formed in the one-piece polymer hood structure whereby sound entering the first end exits the at least one opening, and wherein at least a portion of the passageway comprises a tube structure that is integrally formed with the porous lattice structure of the one-piece polymer hood structure.

Another aspect of the present disclosure is an upper hood module for user supports for vehicles. The upper hood module includes a one-piece polymer hood structure having a base that is configured to be secured to a back frame structure of a user support, and an upper hood structure above the base. The one-piece polymer hood structure includes an outer layer and a porous lattice matrix that is integrally formed with the outer layer. The one-piece polymer hood structure comprises a homogeneous polymer structure formed by an additive process from a first polymer having a first resilience. The hood structure further includes at least one pad secured to the one-piece polymer hood structure. The at least one pad has a forwardly-facing resilient layer of material, a rear layer of material, a resilient porous lattice matrix that is integrally formed with the forwardly-facing resilient layer of material, and with the rear layer of material, whereby the at least one pad comprises a one-piece homogeneous structure, and wherein the porous lattice matrix is disposed between the forwardly-facing resilient layer of material and the rear layer of material. The at least one pad comprises a homogeneous polymer structure formed by an additive process from a second polymer having a second resilience, wherein the second resilience is less than the first resilience.

The porous lattice matrix of the at least one pad may have a porous outer shell extending between the forwardly-facing resilient layer of material and the rear layer of material whereby the porous outer shell is exposed and visible.

The at least one pad may comprise left and right pads that are positioned side-by-side, and the left and right pads may comprise thermoplastic polyurethane.

The at least one pad may include a plurality of cavities formed in the rear layer of material, and the one-piece polymer hood structure may include a plurality of protrusions positioned in the cavities of the at least one pad.

The base of the one-piece polymer hood structure may include a porous lattice matrix that is integrally formed with an impervious outer layer extending around at least a portion of the porous lattice matrix, and the porous lattice matrix of the base of the one-piece polymer hood structure may extend horizontally across a lower portion of the base of the one-piece polymer hood structure.

The one-piece polymer hood structure may include a central opening and first and second side openings, wherein the central opening and the first and second side openings may extend through the one-piece polymer hood structure in a fore-aft direction above the at least one pad.

Another aspect of the present disclosure is a method of making a user support for vehicles. The method includes providing a frame having a lower portion and an upright back portion. The method further includes forming a homogenous one-piece polymer hood structure utilizing an additive process. The additive process includes forming an outer layer of polymer material extending around at least a portion of a porous lattice matrix such that the outer layer of polymer material is integrally formed with the porous lattice matrix. The method further includes securing a resilient pad to a front side of the one-piece polymer hood structure.

An additive process may be utilized to form the resilient pad from a material having greater resilience than the polymer material of the hood structure, and the at least one pad may include a resilient porous lattice matrix.

The method may include utilizing an additive process to form a sound tube extending upwardly through the porous lattice matrix of the one-piece polymer hood structure, wherein the sound tube is integrally formed with the porous lattice matrix, and forms an opening on a front side of the one-piece polymer hood structure.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
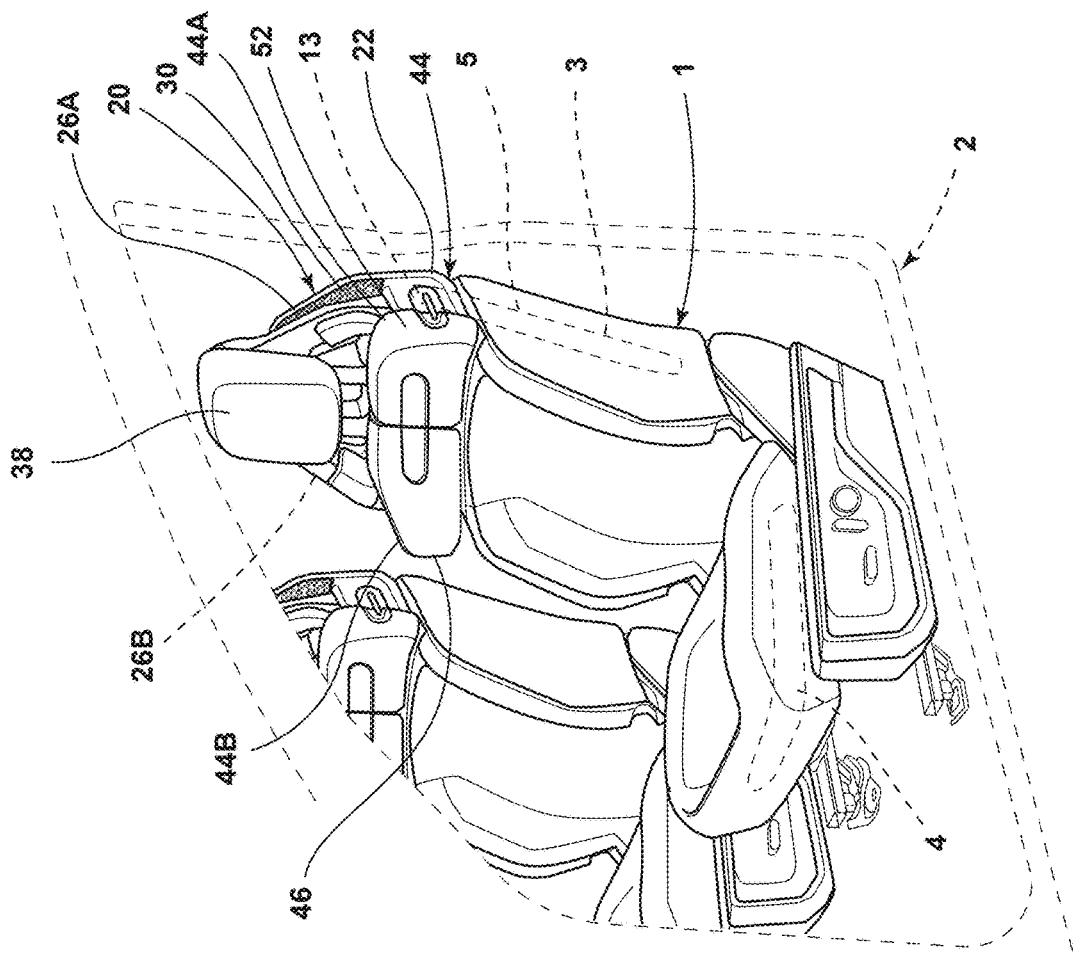
FIG. 1 is a partially fragmentary perspective view of a user support for vehicles according to an aspect of the present disclosure.
Figure 2:
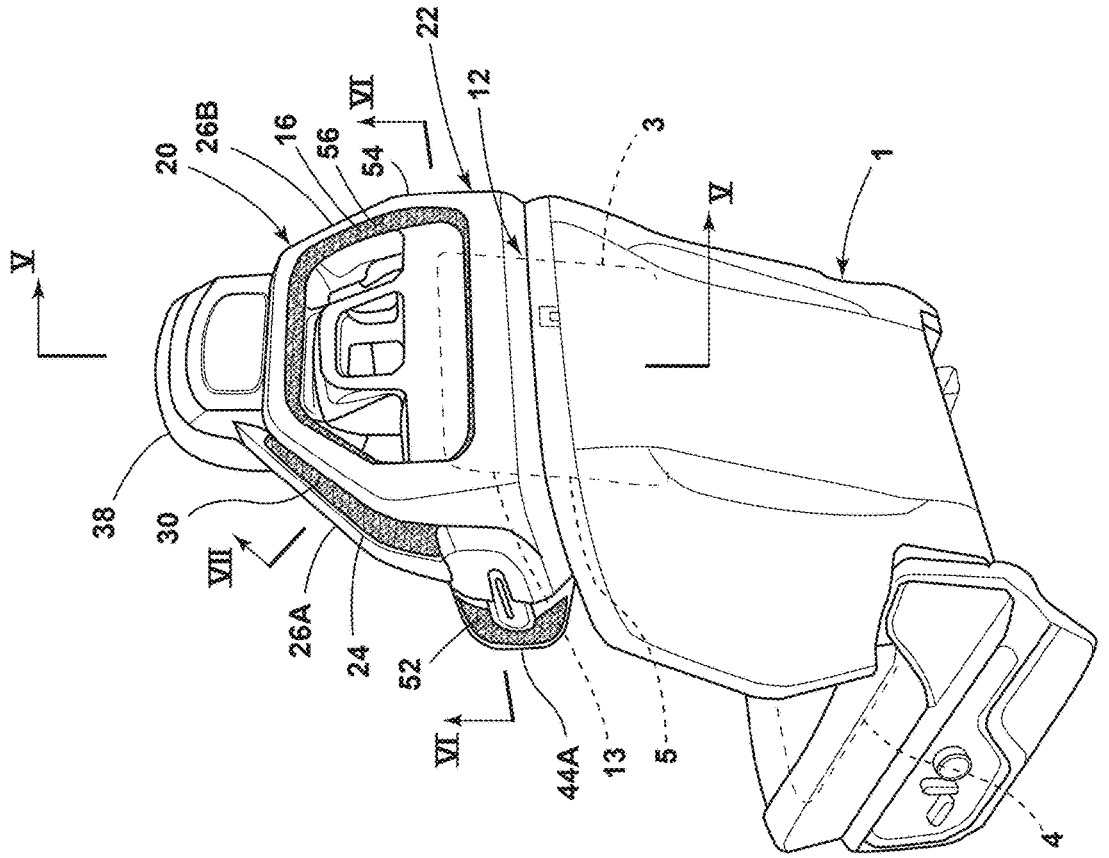
FIG. 2 is a perspective view of the user support of FIG. 1.

The present application is related to U.S. patent application Ser. No. 18/541,739, entitled "A USER SUPPORT ASSEMBLY FOR VEHICLES", filed on Dec. 15, 2023, and U.S. patent application Ser. No. 18/541,851, entitled "VEHICLE USER SUPPORT INCLUDING FLEXIBLE LIGHTING FEATURES", filed on Dec. 15, 2023, the entire contents of which are incorporated herein by reference.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIGS. 1-5, a seat or user support 1 is configured for use in vehicles 2 or other suitable applications. The user support 1 includes a frame 3 (FIG. 3) having a lower portion 4 and a generally upright back portion 5 that extends upwardly from the lower portion 4. A lower cushion 8 is secured to the lower portion 4 of frame 3. The lower cushion 8 includes an upwardly facing surface 9. User support 1 further includes a back cushion 10 that may be secured to the upper portion 5 of frame 3. The back cushion 10 has a forward-facing surface 11 and an upper edge 12.

Figure 3:
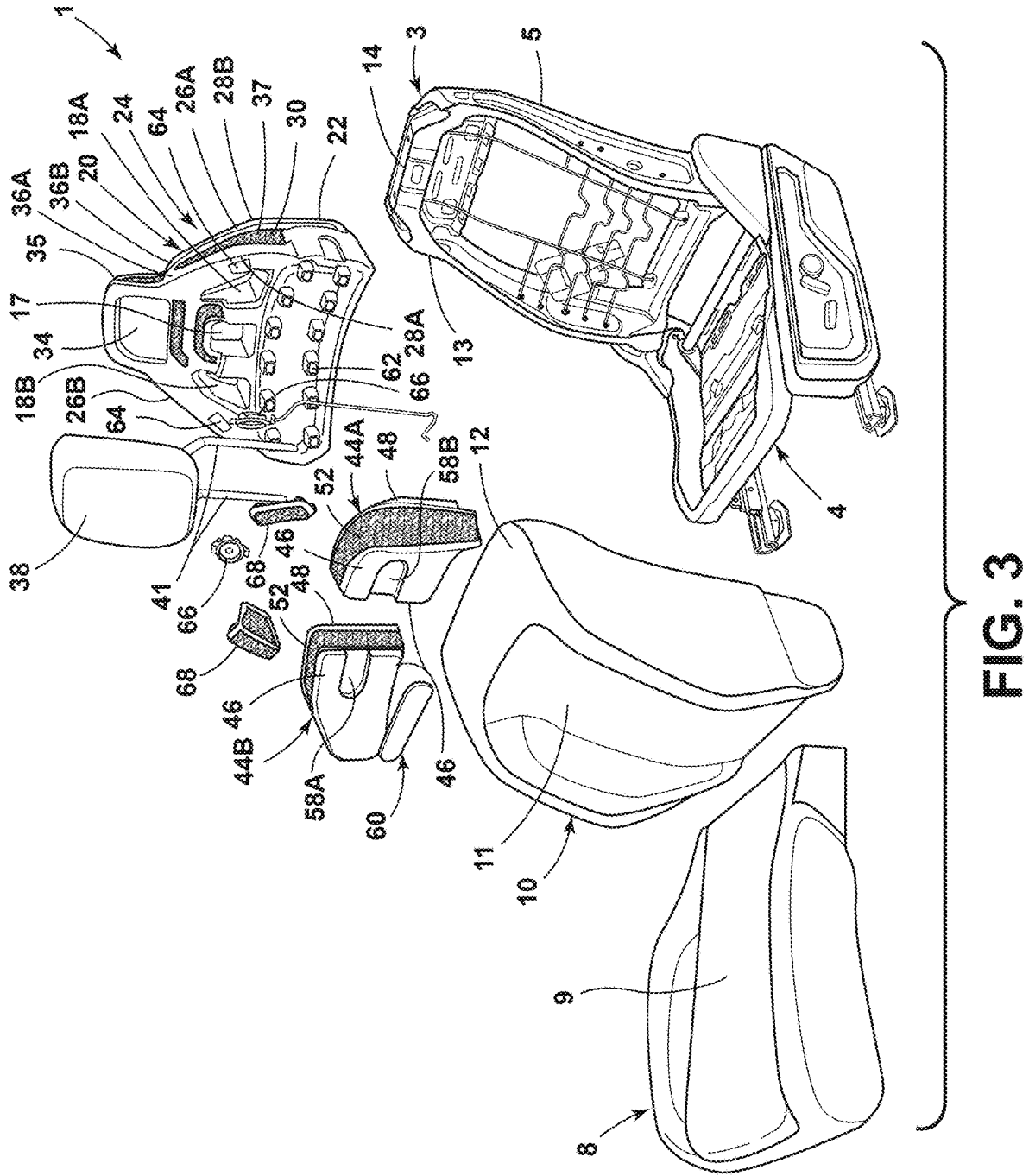
FIG. 3 is an exploded perspective view of the user support of FIGS. 1 and 2.

The back portion 5 of frame 3 may include an upper back frame structure 13 that extends upwardly above the upper edge 12 of back cushion 10. The upper back frame structure 13 includes an upper edge 14 (FIG. 3).

The user support 1 may further include an upper hood module such as a one-piece polymer hood structure 20 that is formed utilizing additive process (e.g. 3D printing). As discussed below, hood structure 20 may include a porous lattice matrix 56 that is integrally formed with an outer shell or layer 54. Outer layer 54 may include a gap or opening 16 (FIGS. 2 and 5), whereby a portion of porous lattice matrix 56 is exposed (visible). One-piece polymer hood structure 20 includes a base 22 that is secured to the upper back frame structure 13, and an upper hood structure 24 extending upwardly above the upper edge 14 of upper back frame structure 13. One-piece polymer hood structure 20 may include an integrally formed pocket 42 (FIG. 5) that receives upper back frame structure 13 to secure the one-piece polymer hood structure 20 to frame 3. Mechanical fasteners or the like may be utilized to secure the one-piece polymer hood structure 20 to back frame 5. The upper hood structure 24 may have a generally upside-down V shape that is formed by left and right outer structures 26A and 26B, respectively. The left and right outer structures 26A and 26B extend upwardly and inwardly from base 22 towards one another. Each of the left and right outer structures 26A and 26B may include elongated front and rear structures 28A and 28B, that are spaced apart to form gaps 30. The one-piece polymer hood structure 20 includes at least one integral porous lattice matrix 32 extending between the elongated front and rear structures 28A and 28B across the gaps 30 (see also FIG. 7). Optionally, a pair of integral porous lattice matrices 32A, 32B (FIG. 7) may extend between elongated front and rear structures 28A and 28B. The one-piece polymer hood structure 20 further includes a forwardly-opening pocket 34 formed by a pocket structure 35 that is integrally formed with the upper ends 36A and 36B of the left and right outer structures 26A and 26B.

The user support 1 further includes a rest 38 having a cushion 40 (e.g. foam). The rest 38 is disposed adjacent to the forwardly opening pocket 34. The rest 38 includes support structure or structures 41 (FIG. 3) that are interconnected with the back portion 5 of frame 3. Cushion 40 may optionally comprise a resilient porous lattice structure having an optional resilient outer layer that is integrally formed with the resilient porous lattice structure.

User support 1 may further include an upper pad assembly 44 including left and right pads 44A, 44B, respectively, that are secured to the one-piece polymer hood structure 20 in a side-by-side configuration. Each pad 44A, 44B includes a forwardly-facing resilient layer 46 of material (see also FIG. 5), a rear layer of material 48, and a porous lattice matrix 50 disposed between the resilient layer 46 and the layer of material 48 utilizing an additive process (e.g. 3D printing) to form a one-piece integral, homogeneous structure. The porous lattice matrix 50 is preferably resilient and integrally formed with the resilient layer 46 and the layer of material 48. The porous lattice matrix 50 has a porous outer shell 52 that extends between the resilient layer 46 and the layer of material 48, such that the porous outer shell 52 is exposed and visible. Outer shell 52 may comprise links of the porous lattice matrix that generally extend parallel to an outermost surface of the porous lattice matrix 50.

Pads 44A and 44B may be formed from a resilient thermoplastic polyurethane (TPU) material utilizing a multi-jet fusion (MJF) additive manufacturing process. The thickness of layers 46 and 48, and the configuration of the porous lattice matrix 50 may be selected to provide a desired level of cushioning (resilience) in the upper back area of a user. Pads 44A and 44B may optionally be configured to have greater resilience than hood structure 20.

Pads 44A and 44B may be formed with pocket halves 58A and 58B, respectively that form a pocket 58 (FIG. 5) whereby a badge 60 can be positioned in the pocket 58. In general, the pocket halves 58A and 58B may be integrally formed in front layers 46 of pads 44A and 44B, respectively.

Figure 4:
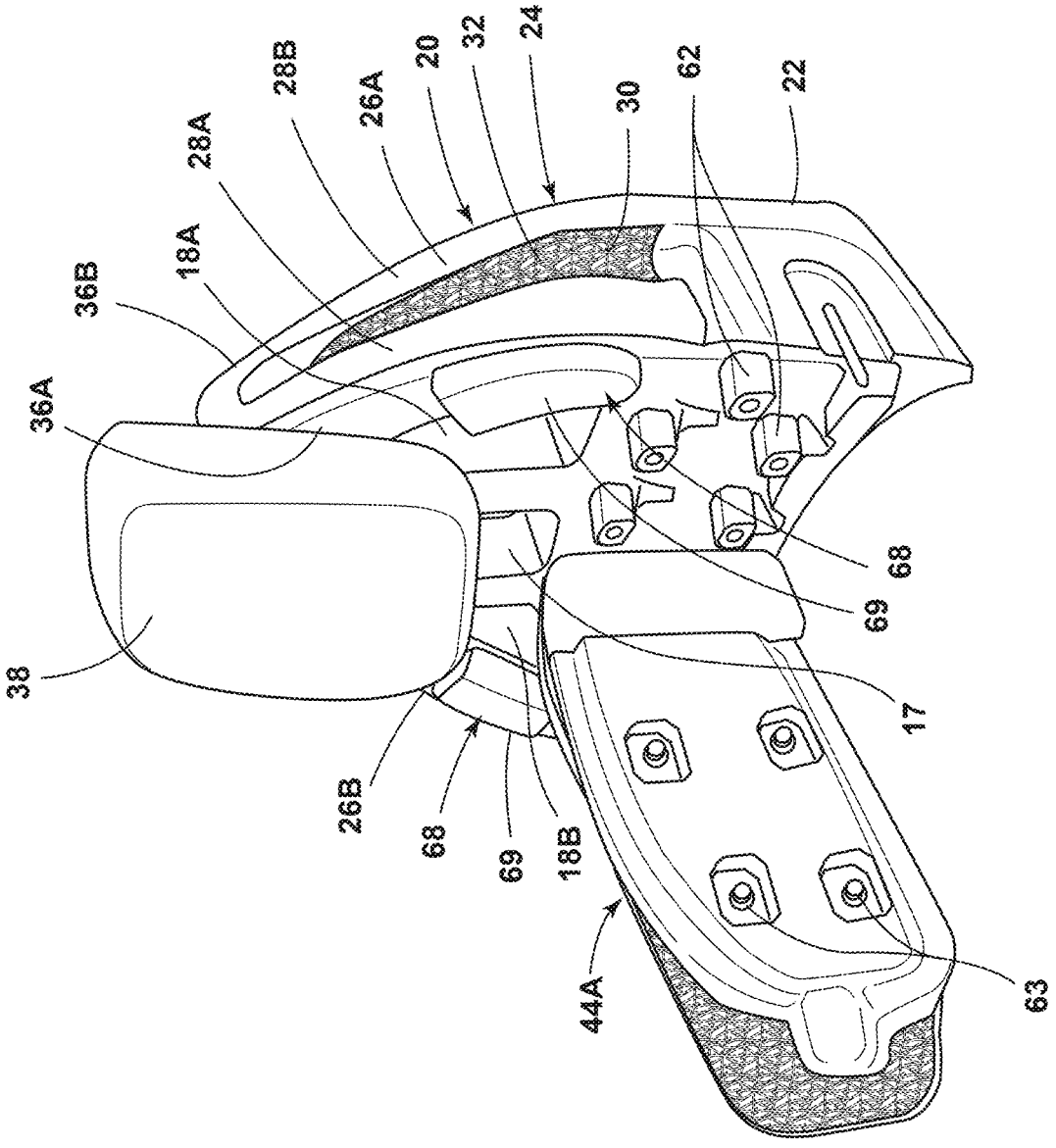
FIG. 4 is an enlarged, partially fragmentary perspective view of a portion of the user support of FIG. 1.

With reference to FIGS. 3 and 4, base 22 of hood 20 may include a plurality of forwardly extending protrusions 66 that are closely received in pockets 63 of pads 44A and 44B to thereby locate and secure the pads to the hood 20. The pads 44A and 44B may be further secured to the hood 20 utilizing mechanical fasteners (e.g. integrally formed snap connectors), threaded fasteners, adhesives, or other suitable arrangement. Thus, protrusions 66 and pockets 63 are merely an example of a suitable connecting arrangement.

Hood 20 may include a central opening 17 and side openings 18A and 18B that pass through the hood 20, and the elongated front and rear structures 28A and 28B may optionally include forwardly-facing openings 64 that receive audio speakers 66. Covers 68 may be secured to the hood 20 over the speaker 66. Covers 68 may have a porous layer 69 that permits sound from speaker 66 to pass through the porous layer 69. The covers 68 may be formed by an additive process, and may comprise, for example, TPU rubber formed by a Multi Jet Fusion (MJF) process or nylon formed utilizing a Selective Laser Sintering (SLS) process.

Figure 5:
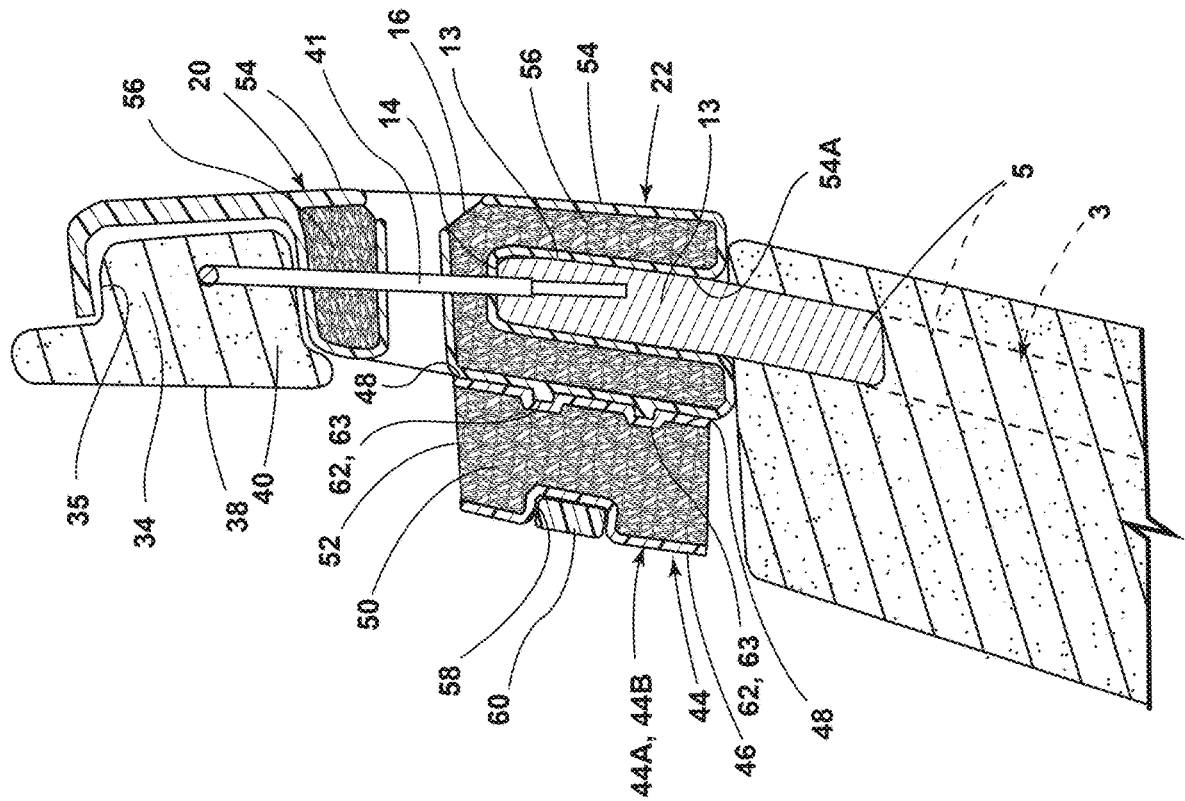
FIG. 5 is a cross-sectional view of the user support of FIG. 2 taken along the line V-V.
Figure 6:
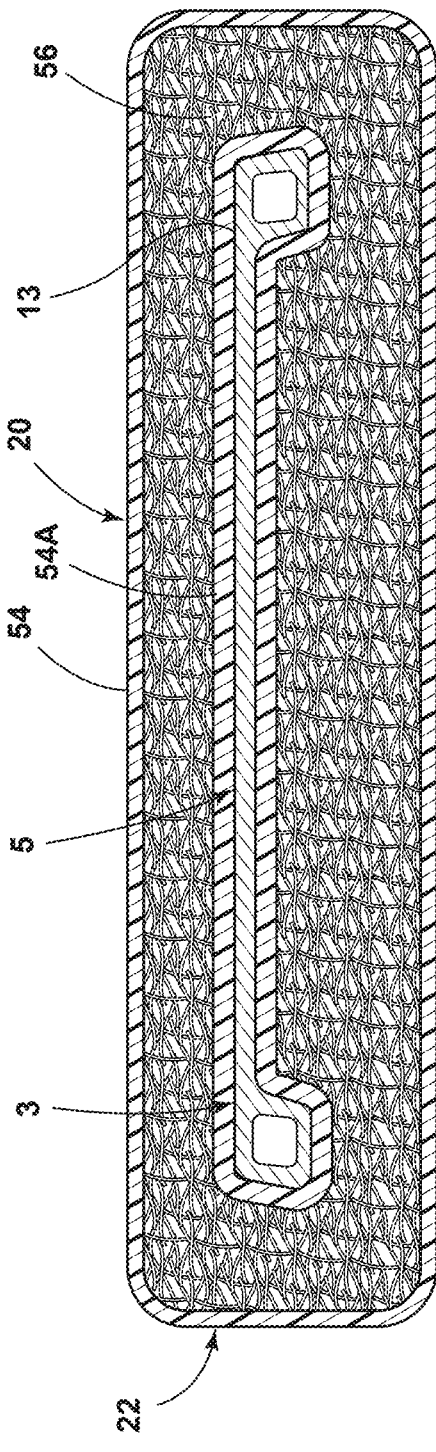
FIG. 6 is a cross-sectional view of the user support of FIG. 2 taken along the line VI-VI.
Figure 7:
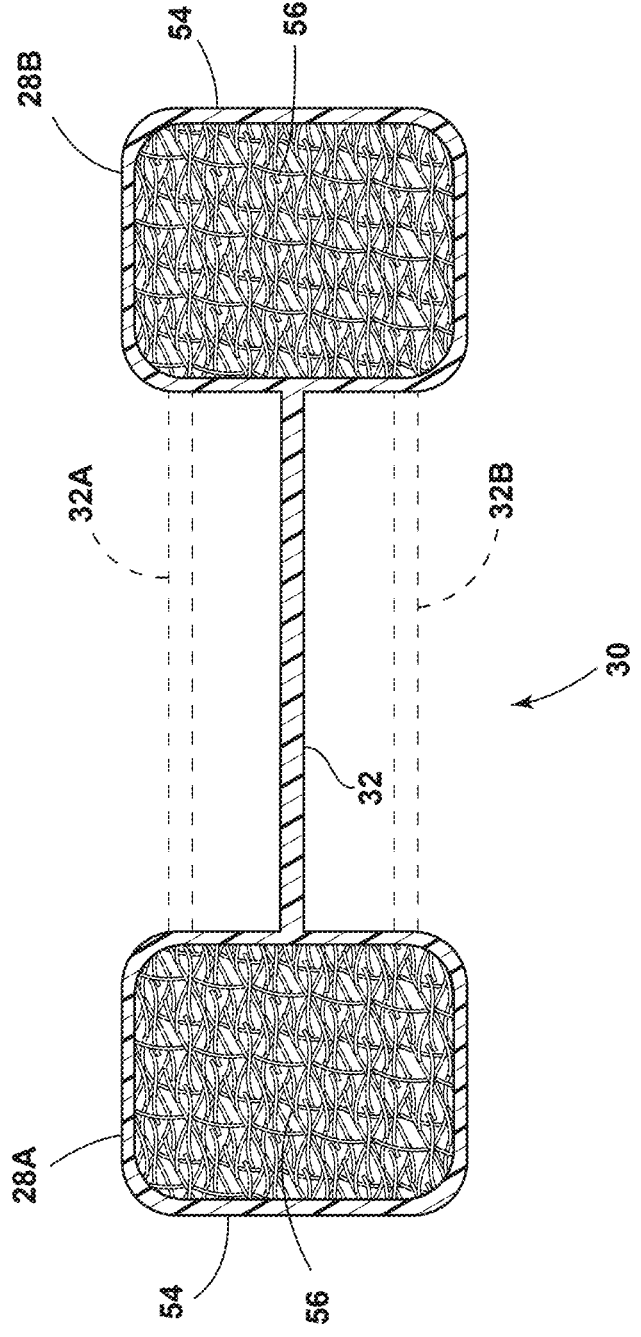
FIG. 7 is a cross-sectional view of the user support of FIG. 2 taken along the line VII-VII.

With further reference to FIGS. 5-7, the one-piece polymer hood structure 20 may comprise an outer skin or layer 54 and an integrally-formed porous lattice matrix 56. The one-piece polymer hood structure 20 may be fabricated utilizing an additive process whereby the outer layer 54 and porous lattice matrix 56 are integrally formed whereby the one-piece polymer hood structure 20 comprises an integral, homogenous structure. In a preferred embodiment, the one-piece polymer hood structure 20 is fabricated utilizing selective laser sintering (SLS) utilizing a nylon polymer material. The thickness and shape of skin or layer 54 and the configuration and thickness of the porous lattice matrix 56 may be varied as required to provide required stiffness and/or other overall structural features of one-piece polymer hood structure 20. Outer layer 54 may be substantially continuous and impervious (except at, for example, gap 16), such that porous lattice matrix 56 is disposed in an integral cavity or space inside outer layer 54. It will be understood that porous lattice matrix 56 may extend through the entire space inside outer later 54, or only portions thereof. For example, outer layer 54 may provide sufficient strength and/or stiffness in some areas such that porous lattice matrix 56 is not required in these areas of hood structure 20.

With reference to FIGS. 5 and 6, base 22 of hood structure 20 may include an integral inner layer or wall 54A that engages upper back frame structure to support hood structure 20 on frame 3. Mechanical fasteners or the like (not shown) may also be utilized to secure hood structure 20 to frame 3.

With reference to FIG. 7, the elongated front and rear structures 28A and 28B may comprise a porous lattice matrix 56 and an integrally formed outer layer 54 that extends around and encapsulates the porous lattice matrix 56. As discussed above, hood structure 20 may optionally include at least some inner spaces or cavities that do not include a porous lattice matrix 56. For example, all or part of the space inside outer layer 54 of front and/or rear structures 28A and 28B may optionally comprise a space that is free of internal structures such as porous lattice matrix 56.

Figure 8:
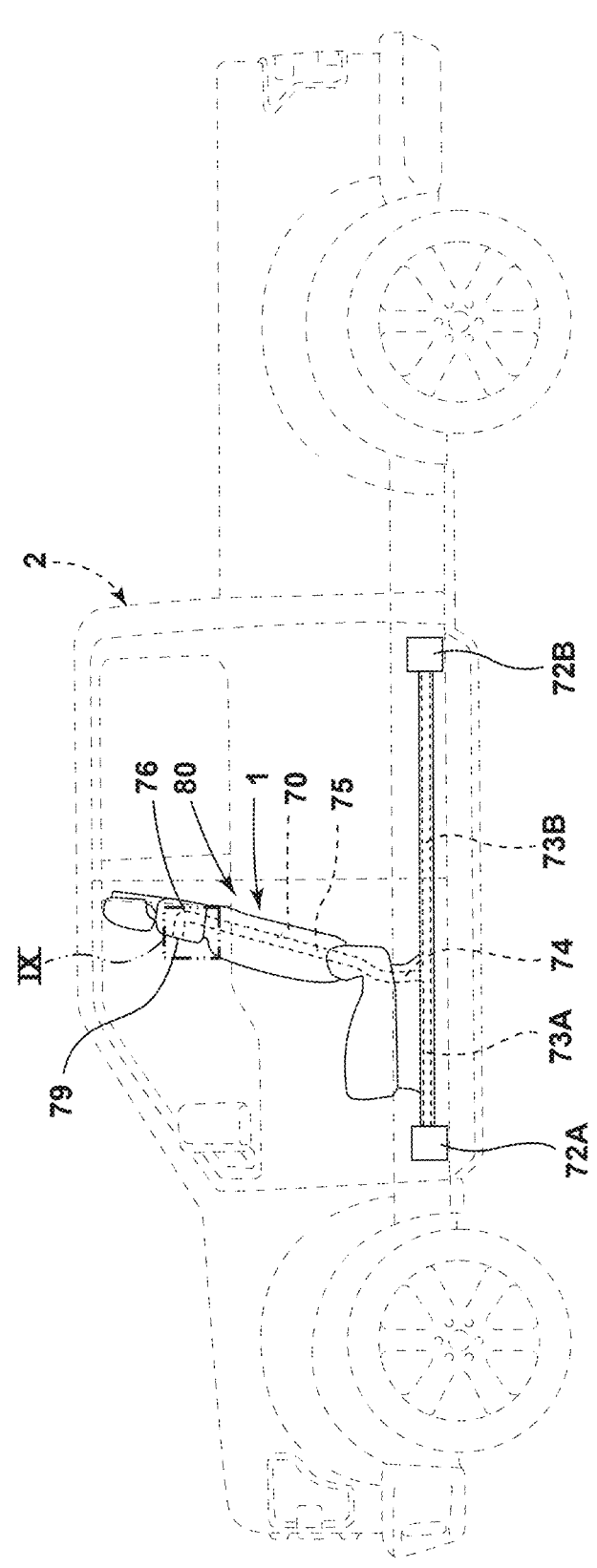
FIG. 8 is a schematic view of a vehicle including a user support according to another aspect of the present disclosure.
Figure 9:
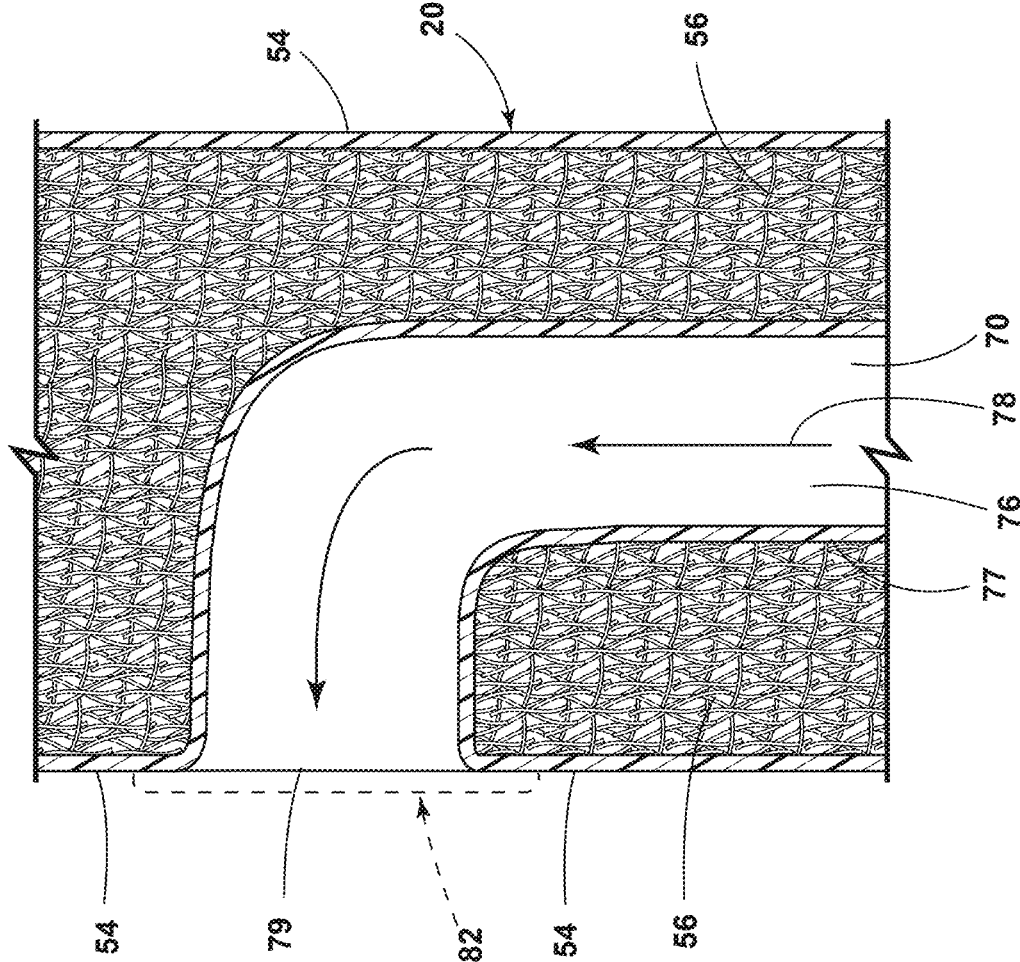
FIG. 9 is a fragmentary enlarged view of a portion of the user support of FIG. 8.

With further reference to FIGS. 8 and 9, user support 1 may include a sound enhancing system 80 that includes an audio (sound) passageway 70 that is operatively coupled to one or more sources of sound 72A and 72B. The passageway 70 may include one or more sections in the form of tubes 73A and 73B that are connected to an upwardly extending portion 75 at a junction 74. An upper portion 76 (FIG. 9) of the passageway 70 comprise by a layer 77 of material in the form of a tube structure that is integrally formed with lattice 56 whereby sound 78 travels through the upper portion 76 of passageway 70 and exits at an upper opening 79. User support 1 may include two or more openings 79 that may be operably (fluidly) connected to separate branches of a single passageway 70, wherein the branches extend from a "Y" joint in passageway 70. Alternatively, two or more openings 79 may be operably connected to two or more passageways 70. The opening 79 may be formed in a similar manner and provided at a similar location as the openings 64 (FIG. 3) for speaker 66 and porous covers or grilles 82 may be positioned over opening(s) 79.

The audio passageway 70 is preferably a continuous passageway that causes sound from one or more sources 72A, 72B, etc. to enter a first end of tubes 73A and/or 73B and travel through the passageways 70 to the opening or openings 79 and exit audio passageway 70 adjacent to a user.

Examples of sound sources 72A and 72B include engine noises or other desirable noises as disclosed in U.S. Pat. No. 11,280,303, the entire contents of which is incorporated by reference. For example, source 72A may be located under a hood of vehicle 2 and may comprise an induction system of an internal combustion system, and source 72B may comprise an exhaust system of an internal combustion engine. In general, a single source 72A or 72B may be utilized. It will be understood that the passageways 70 and sound sources 72A and 72B of FIG. 8 are schematic in nature, and the passageways 70 may have a wide range of configurations, and the sound sources 72A, 72B, etc. may comprise a wide variety of sources of sound.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A user support for vehicles, the user support comprising:

a frame having a lower portion and a back portion that extends upwardly from the lower portion, wherein the back portion of the frame includes an upper back frame structure having an upper edge;

a lower cushion secured to the lower portion of the frame, the lower cushion having an upwardly facing surface;

a back cushion secured to the back portion of the frame, the back cushion having a forwardly facing surface and an upper edge;

a one piece polymer hood structure having a base secured to the upper back frame structure, and an upper hood structure extending upwardly above the upper edge of the upper back frame structure; and an upper pad assembly secured to the one piece polymer hood structure whereby the upper pad assembly is positioned above the upper edge of the back cushion, the upper pad assembly including at least one pad having a forwardly-facing resilient layer of material, a rear layer of material, and a resilient porous lattice matrix that is integrally formed with the forwardly-facing resilient layer of material and with the rear layer of material to form a one-piece homogeneous polymer structure, wherein the porous lattice matrix is disposed between the forwardly-facing resilient layer of material and the rear layer of material, the resilient porous lattice matrix having an integral porous outer shell extending between the forwardly-facing resilient layer of material and the rear layer of material whereby the porous outer shell is exposed and visible.

2. The user support of claim 1, wherein:

the one piece polymer hood structure is formed from nylon utilizing an additive process whereby the one piece polymer hood structure is homogeneous.

3. The user support of claim 1, wherein:

the at least one pad comprises left and right pads disposed in a side-by-side configuration, wherein the left and right pads are formed from thermoplastic polyurethane utilizing an additive process.

4. The user support of claim 3, wherein:

each of the left and right pads have a lower edge that is spaced apart from the upper edge of the back cushion to form a horizontally extending gap.

5. The user support of claim 1, wherein:

the upper hood structure includes integral left and right outer structures, each including elongated front and rear structures extending towards each other whereby a size of a gap between the elongated front and rear structures is reduced at upper ends of the elongated front and rear structures.

6. The user support of claim 5, wherein:
the one-piece polymer hood structure includes a forwardly opening pocket formed by a pocket structure that is integrally formed with upper ends of the left and right outer structures; and including:
a rest having a cushion disposed adjacent to the forwardly opening pocket; and
a support structure interconnecting the rest with the back portion of the frame.

7. The user support of claim 6, wherein:
the left and right outer structures extend upwardly and inwardly from the base towards one another.

8. The user support of claim 7, wherein:
the one-piece polymer hood structure includes an integral porous lattice matrix extending between the elongated front and rear structures across the gaps, wherein the integral porous lattice matrix between the elongated front and rear structures has an exposed outer side that is visible.

9. The user support of claim 8, wherein:
each of the elongated front and rear structures comprise a porous lattice matrix and an impervious outer layer extending around and encapsulating the porous lattice matrix.

10. The user support of claim 9, wherein:
the base of the one-piece polymer hood structure includes a porous lattice matrix that is integrally formed with an impervious outer layer extending around at least a portion of the porous lattice matrix, wherein the porous lattice matrix of the base of the one-piece polymer hood structure extends horizontally across a lower portion of the base of the one-piece polymer hood structure.

11. The user support of claim 10, including:
a sound passageway having a first end that is configured to be operably coupled to a source of sound whereby sound enters the first end of the sound passageway, the sound passageway having a second end with at least one opening formed in the one-piece polymer hood structure whereby sound entering the first end exits the at least one opening, and wherein at least a portion of the passageway comprises a tube structure that is integrally formed with the porous lattice structure of the one-piece polymer hood structure.

12. An upper hood module for user supports for vehicles, the upper hood module comprising:
a one-piece polymer hood structure having a base that is configured to be secured to a back frame structure of a user support, and an upper hood structure above the base, the one-piece polymer hood structure including an outer layer and a porous lattice matrix that is integrally formed with the outer layer, and wherein the one-piece polymer hood structure comprises a homogeneous polymer structure formed by an additive process from a first polymer having a first resilience; and
at least one pad secured to the one-piece polymer hood structure, the at least one pad having a forwardly-facing resilient layer of material, a rear layer of material, and a resilient porous lattice matrix that is integrally formed with the forwardly-facing resilient layer of material and with the rear layer of material, whereby the at least one pad comprises a one-piece homogeneous structure, and wherein the porous lattice matrix is disposed between the forwardly-facing resilient layer of material and the rear layer of material, wherein the at least one pad comprises a homogeneous polymer structure formed by an additive process from a second polymer having a second resilience, wherein the second resilience is less than the first resilience.

13. The upper hood module of claim 12, wherein:
the porous lattice matrix of the at least one pad has a porous outer shell extending between the forwardly-facing resilient layer of material and the rear layer of material whereby the porous outer shell is exposed and visible.

14. The upper hood module of claim 12, wherein:
the at least one pad comprises left and right pads positioned side-by-side; and
the left and right pads comprise thermoplastic polyurethane.

15. The upper hood module of claim 12, wherein:
the at least one pad includes a plurality of cavities formed in the rear layer of material; and
the one-piece polymer hood structure includes a plurality of protrusions positioned in the cavities of the at least one pad.

16. The upper hood module of claim 12, wherein:
the base of the one-piece polymer hood structure includes a porous lattice matrix that is integrally formed with an impervious outer layer extending around at least a portion of the porous lattice matrix, wherein the porous lattice matrix of the base of the one-piece polymer hood structure extends horizontally across a lower portion of the base of the one-piece polymer hood structure.

17. The upper hood module of claim 12, wherein:
the one-piece polymer hood structure includes a central opening and first and second side openings, wherein the central opening and the first and second side openings extend through the one-piece polymer hood structure in a fore-aft direction above the at least one pad.

18. A method of making a user support for vehicles, the method comprising:
providing a frame having a lower portion and an upright back portion;
forming a homogenous one-piece polymer hood structure utilizing an additive process, including forming an outer layer of polymer material extending around at least a portion of a porous lattice matrix such that the outer layer of polymer material is integrally formed with the porous lattice matrix; and
securing a resilient pad to a front side of the one-piece polymer hood structure.

19. The method of claim 18, including:
utilizing an additive process to form the resilient pad from a material having greater resilience than the polymer material of the hood structure, the at least one pad including a resilient porous lattice matrix.

20. The method of claim 18, including:
utilizing an additive process to form a sound tube extending upwardly through the porous lattice matrix, wherein the sound tube is integrally formed with the porous lattice matrix and forms an opening on a front side of the one-piece polymer hood structure.

* * * * *